May 20, 1941.    R. W. STAGGS    2,242,897
CONTROL SYSTEM
Filed June 30, 1939
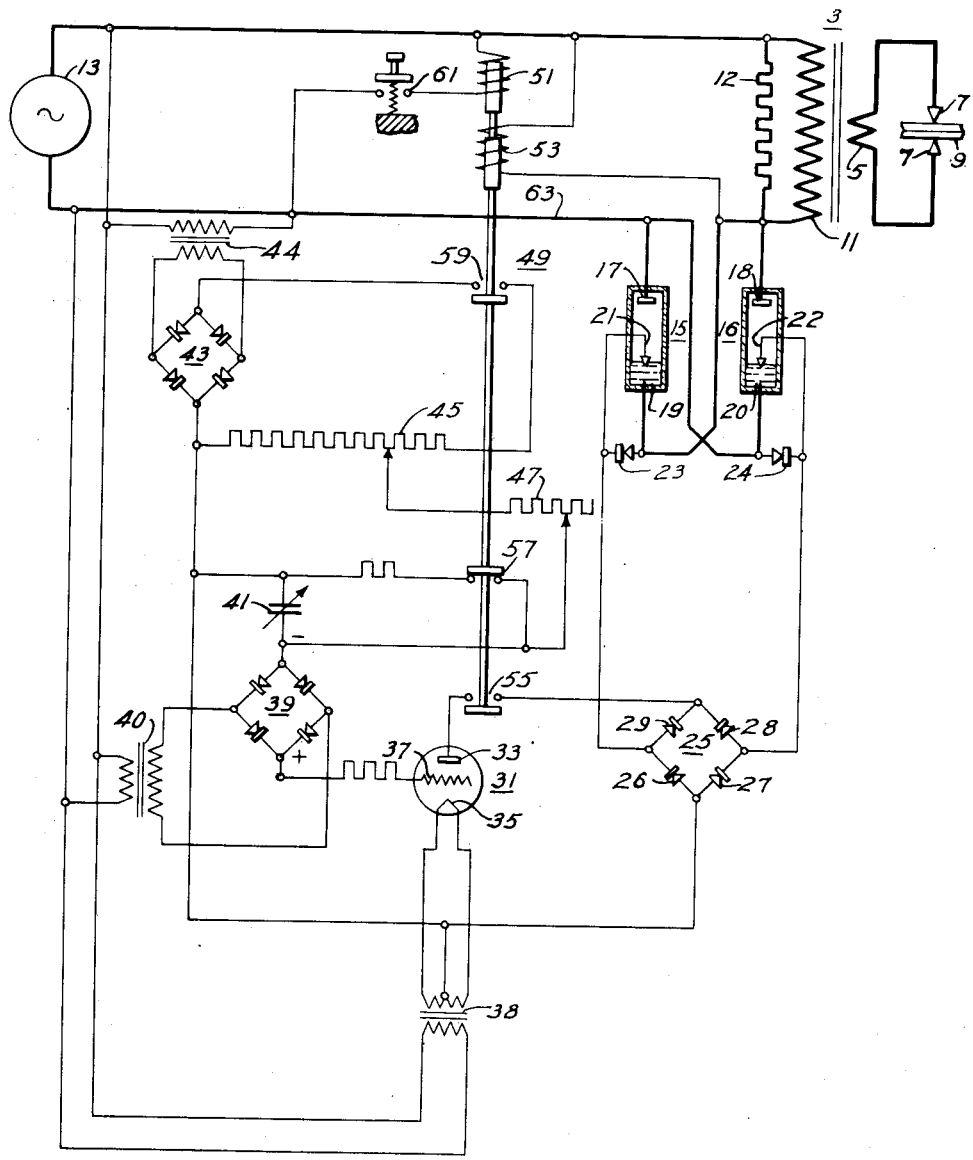
WITNESSES:
H. F. Susser.
Leon J. Taza.
INVENTOR
Russell W. Staggs.
BY
F. W. Lyle
ATTORNEY Patented May 20, 1941

2,242,897

UNITED STATES PATENT OFFICE 2,242,897

CONTROL SYSTEM

Russell W. Staggs, Detroit, Mich., assignor to Westinghouse Electric & Manufacturing Company, East Pittsburgh, Pa., a corporation of Pennsylvania Application June 30, 1939, Serial No. 282,175

12 Claims. (Cl. 250—27)

My invention relates to control systems and it has particular relation to control systems utilizing electric discharge apparatus for controlling the flow of power from a source to a work circuit.

An object of my invention is to provide a system of simple structure incorporating a minimum of auxiliary discharge devices for controlling the current flow through a pair of main electric discharge devices.

Another object of my invention is to provide a system of simple structure incorporating a minimum of auxiliary discharge devices for controlling current flow through a pair of main electric discharge devices of the immersed ignition electrode type connected in anti-parallel.

A more general object of my invention is to provide a novel circuit for controlling an electric discharge device of the immersed ignition electrode type.

A further object of my invention is to provide a simple, efficient, and inexpensive system for controlling the current flow from a source to a load.

An ancillary object of my invention is to provide a resistance, spot and seam welding system of simple construction that shall operate reliably and efficiently.

In accordance with my invention, power is supplied to the material to be welded, or to any other suitable load from an alternating-current source through electric discharge devices of the arc-like type. The main discharge devices are controlled by an auxiliary discharge device of the arc-like type. When the latter is rendered conductive, current flows through the main discharge devices and the load, and when the auxiliary discharge device is non-conductive, the current flow through the main discharge devices is interrupted.

The auxiliary discharge device is rendered conductive by the application of energizing potential in its control circuit. It is rendered non-conductive by the application in its control circuit of a potential counteracting the energizing potential.

The control system for the pair of electric discharge devices of the immersed ignition electrode type connected in anti-parallel is simplified, in accordance with my invention, by interconnecting the ignition electrodes of the discharge devices through a high impedance network made up of relatively low impedance elements, and supplying ignition current to the discharge devices through the low impedance elements. In particular, the ignition electrodes are interconnected by a network comprising a plurality of rectifiers arranged for full wave rectification. To supply ignition current, the impedance of the network is controlled by means of the auxiliary discharge device referred to hereinabove.

Finally, I provide an auxiliary relay which opens the circuit for the auxiliary discharge device after each welding interval and reestablishes the control circuit to its initial condition. To initiate the flow of welding current, a closing coil of the relay is connected across the source. Simultaneously with the initiation of the flow of welding current, a holding coil of the relay which is connected directly across the welding load becomes energized to maintain the relay in the closed position. When the main discharge devices are rendered non-conductive, the holding coil becomes deenergized and the relay is actuated to the open position. The relay remains in the open position until the initiation of a new welding operation.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawing, the sole figure of which is a diagrammatic view of an embodiment of my invention.

The apparatus shown in the drawing comprises a load welding transformer 3, to the terminals of the secondary 5 of which a pair of welding electrodes 7 are connected. The electrodes engage the material 9 to be welded and when current is transmitted through a primary 11 of the transformer, welding current flows through the material. If desired, a discharge resistor 12 may be connected across the primary winding 11 so that a more rapid decay of transformer flux will result when the circuit, through the welding electrode 7, is opened.

The primary 11 of the transformer is supplied from an alternating-current source 13, which may be of the usual 60-cycle commercial type, through a pair of electric discharge devices 15 and 16 connected in anti-parallel. The discharge devices are of the immersed ignition electrode type. The discharge device 15 has an anode 17, a mercury pool cathode 19, and an ignition electrode 21. Similarly, the discharge device 16 has an anode 18, mercury pool cathode 20 and an ignition electrode 22. If desired, (although such is not necessary to operativeness), a rectifier 23, preferably of the dry type, may be connected between the starting electrode 21 and the cathode 19, and similarly, a rectifier 24 may be connected between starting electrode 22 and cathode 20. For example, if the characteristics of the starting electrodes 21 and 22 are different, rectifiers 23 and 24 may be utilized to shunt part or all of the starting electrode current during a predetermined portion of the cycle of the alternating current.

The ignition electrodes 21 and 22 of the discharge devices are interconnected by a network 25 arranged as a conventional full wave rectifier bridge circuit comprising a plurality of rectifiers 26, 27, 28 and 29. The network 25 is arranged to convert the alternating current from the source through the ignition electrodes into a unidirectional current for control purposes. While the rectifiers 26, 27, 28 and 29 are preferably of the dry type, it will be understood that rectifiers of the electronic or gaseous discharge type may be utilized.

To control the flow of ignition current, an auxiliary discharge device 31 is provided. The latter is preferably of the arc-like type and comprises an anode 33, a hot cathode 35, and a control electrode 37 and a gaseous medium at a suitable pressure. The cathode 35 of the auxiliary discharge device 31 is connected to the junction of rectifiers 26 and 27. The anode 33 of the auxiliary discharge devices is connected to the junction of rectifiers 28 and 29. The cathode 35 may be energized by a transformer 38 or any other suitable means.

To control the energization of the auxiliary discharge device 31, control potential is impressed between the control electrode and the cathode by means of a timer. The timing means comprises a full wave rectifier 39 energized by source 13 through a transformer 40, or any other suitable source of potential and a capacitor 41 connected in series between the control electrode 37 and the cathode 35. A source of unidirectional potential comprising a full wave rectifier 43, which may be energized from source 13 through a transformer 44, and potentiometer 45 is connected across capacitor 41 through an adjustable resistor 47. Rectifiers 39 and 43 may be of the dry copper-copper oxide type. An electro-magnetic device or a relay 49 having a closing coil 51, a holding coil 53, and a plurality of contact members 55, 57 and 59 is also provided. It will be understood that conventional starters or timers, many of which are well known in the art, may be utilized for controlling the auxiliary discharge device 31.

To initiate a welding operation, a circuit controller 61 which is preferably manually operated and may be a foot switch or a pushbutton, is closed to thus energize closing coil 51 and actuate relay 49 to thus open the circuit through contact members 57 and close the circuit through contact members 55 and 59. The closing of lower contact members of relay 55 completes the circuit across the network 25 through the auxiliary discharge device 31. Because of the positive potential impressed on control electrode 37 by the source 39, the auxiliary discharge device 31 is rendered conductive.

Assume that at the instant under consideration, the polarity of the source 13 is such that the anode 17 of the left-hand discharge device 15 and the cathode 20 of the right discharge device 16 are positive relative to the cathode 19 of the left-hand discharge device and the anode 18 of the right-hand discharge device. Ignition current will then flow through a circuit which extends from the energized cathode 20 through ignition electrode 22, rectifier 28, contact members 55 of relay 49, anode 33 and cathode 35 of auxiliary discharge device 31, rectifier 26, ignition electrode 21 to the energized cathode 19. This ignition current causes discharge device 15 to be rendered conductive and current to flow from source 13 through the left-hand discharge device 15 and primary 11 of the welding transformer 3. Current does not flow through the right-hand discharge device because at this time, its anode 18 is negative relative to its cathode 20.

Holding coil 53 connected in parallel and which may be connected in series with primary winding 11 also becomes energized thus maintaining the relay 49 in the closed position. Closing coil 51 becomes deenergized as soon as switch 61 is released.

It will be understood that the holding coil 53 may be omitted from relay 49 and a holding circuit may be established by connecting conductor 63 to the junction of switch 61 and closing coil 51. It will also be understood that closing coil 51 may be omitted from relay 49 and utilized to actuate a second relay having two sets of normally open contact members, one set connected in parallel with contact members 55 and the second set connected in parallel with contact members 59.

When the potential of the source 13 reverses, the ignition current flows from energized cathode 19 through control electrode 21, rectifier 29, contact members 55, auxiliary discharge device 31, rectifier 27 and control electrode 22 to energized cathode 20. However, at this time, the anode potential of the right-hand discharge device 16 is positive and the latter is rendered conductive, while the left-hand discharge device is not conductive. It is to be noted that as soon as one or the other of the main discharge devices 15 or 16 is rendered conductive and this occurs immediately after the initiation of current flow through the associated electrodes, the network 25 and auxiliary discharge device 31 are short circuited by the main discharge device and the current flow through the ignition electrodes 21 and 22 is discontinued for the remainder of the half cycle. In this manner, power loss and the other disadvantages arising from the continuous current flow through the ignition electrodes, is avoided.

The opening of contact members 57 opens the circuit shunting the discharged capacitor 41. The closing of the upper contact members 59 completes the circuit for energizing potentiometer 45, thus the capacitor 41 is gradually charged through adjustable resistor 47 and a negative bias is impressed in the circuit of control electrode 37 to counteract the positive potential of rectifier 39. The time required for charging capacitor 41 may be varied by changing the setting of the adjustable tap of resistor 47 or by changing the setting of the capacitor if a variable capacitor is utilized. When the resultant potential impressed between the control electrode 37 and the cathode 35 reaches a predetermined value, the auxiliary discharge device 31 is rendered non-conductive. Thus ignition current no longer flows through ignition electrodes 21 and 22 and network 25. The main discharge devices 15 and 16 become non-conductive and remain non-conductive and the current flow through the welding transformer 3 is discontinued. The holding coil 53 of relay 49 is now deenergized and relay 49 is actuated to open contact members 55 and 59 and close contact members 57.

The opening of contact members 59 opens the circuit through potentiometer 45. The closing of contact members 57 in parallel with capacitor 41 completes the circuit for discharging the capacitor 41 in preparation for the next cycle of operation. The opening of contact members 55 prevents the auxiliary discharge device 31 from being rendered conductive until the next cycle of operation is initiated by the closing of switch 61.

Should it be desirable to automatically reinitiate the cycle of operation after a predetermined time, a second timer, (such as, for example, timer B shown in Fig. 149 on page 128 of Industrial Electronics by F. H. Gulliksen and E. H. Vedder) may be utilized. The primary winding of the transformer of timer B may be connected across the source 13, the contact members of relay 3, which open a circuit when the operating coil of relay 3 is deenergized, are connected in series with switch 61 and closing coil 51, and contact members of relay 4 connected in the circuit of timer B may be actuated by relay 49. The timing means for auxiliary discharge device 31 is adjusted to give the proper weld regardless of operating speed. The second timer is then adjusted to give the operator the required time to move the work. Each timer is adjustable independently of the other. The operation of the system continues so long as switch 61 is closed.

Furthermore, it will be understood that the control system may be utilized for seam welding by employing a suitable timer, such as the timer utilized in Fig. 7 of the patent to Edwin H. Vedder, No. 2,111,013, dated March 15, 1938, and assigned to Westinghouse Electric & Manufacturing Company, in place of the timer shown in the drawing and hereinabove described. The control circuit of this timer may be energized from source 13. The positive terminal of battery 76 is connected to cathode 35 of auxiliary discharge device 31 instead of the intermediate tap of resistor 80, and the conductor from the junction of secondary winding of transformer 72 and resistor 73 is connected to control electrode 37 of discharge device 31 instead of the intermediate tap of transformer winding 79.

It is to be noted that while the discharge devices 15 and 16 are illustrated as separate valves, they may, under certain circumstances, be replaced by a single double-polarity discharge device comprising a pair of mercury pool electrodes in each of which an ignition electrode is immersed.

I do not wish to be restricted to the specific structural details, arrangements of parts or circuit connections herein set forth, as various modifications thereof may be effected without departing from the spirit and scope of my invention. I desire, therefore, that only such limitations shall be imposed as are indicated in the appended claims.

I claim as my invention:

1. In combination, a pair of electric discharge devices connected in anti-parallel for controlling the supply of power from a source to a work circuit, each discharge device having a plurality of principal electrodes and an ignition electrode in contact with one of the said principal electrodes, a network connected between the said ignition electrodes, the said network comprising a plurality of rectifiers, an auxiliary electric discharge device connected across the said network, control means associated with the said auxiliary discharge device for controlling the flow of current through the said network and thereby controlling the energization of the said pair of discharge devices.

2. In combination, a pair of electric discharge devices connected in anti-parallel for controlling the supply of power from a source to a work circuit, each discharge device having a plurality of principal electrodes and a control electrode, a network comprising a plurality of rectifiers, the said network having a junction connected to one of said control electrodes and another junction connected to the other of said control electrodes, an auxiliary electric discharge device connected across the said network and control means associated with said auxiliary discharge device for controlling the flow of current through the said network and thereby controlling the energization of the said pair of discharge devices.

3. In combination, a pair of electric discharge devices connected in anti-parallel for controlling the supply of power from a source to a load, each discharge device having a plurality of principal electrodes and an ignition electrode in contact with one of said principal electrodes, a full wave rectifier connected between the said control electrodes and means associated with said full wave rectifier for controlling the flow of ignition current through said ignition electrodes.

4. In combination, a pair of electric discharge devices connected in anti-parallel for controlling the supply of power from a source to a load, each discharge device having a plurality of principal electrodes and an ignition electrode in contact with one of said principal electrodes, a high impedance network connected between said ignition electrodes, said network comprising a plurality of rectifiers of the dry type, and means connected across said network for varying the impedance of said network.

5. In combination, a pair of electric discharge devices connected in anti-parallel for controlling the supply of power from a source of alternating current to a load, each discharge device having an anode, a mercury pool cathode and an ignition electrode in contact with said cathode, a high impedance network connected between said ignition electrodes, said network comprising a plurality of rectifiers of the dry type, means connected across said network for varying the impedance of said network, said means comprising an auxiliary electric discharge device and control means for the said discharge device.

6. In combination, a pair of electric discharge devices connected in anti-parallel, each discharge device having a plurality of principal electrodes and an ignition electrode in contact with one of said principal electrodes, means for impressing an alternating potential between said principal electrodes, a network connected between the said ignition electrodes, the said network comprising a plurality of rectifiers and means connected across said network for controlling the flow of ignition current through said ignition electrodes.

7. In combination, a pair of electric discharge devices connected in anti-parallel, each discharge device having a plurality of principal electrodes and an ignition electrode in contact with one of said principal electrodes, means for impressing an alternating potential between said principal electrodes, a network connected between said ignition electrodes, the said network comprising a plurality of rectifiers, and means connected across said network for controlling the flow of ignition current through said ignition electrodes, said means comprising an auxiliary electric discharge device and timing means for the said auxiliary discharge device.

8. In combination, a pair of electric discharge devices connected in anti-parallel for controlling the supply of power from a source to a load, each discharge device having a plurality of principal electrodes and an ignition electrode in contact with one of said principal electrodes, a full wave rectifier connected between the said control electrodes and means associated with said full wave rectifier for controlling the flow of ignition current through said ignition electrodes, the said means including an auxiliary electric discharge device and timing means for the said auxiliary discharge device.

9. For use in supplying an alternating current load from a source of alternating current, the combination comprising a pair of electric discharge devices of the immersed ignition electrode type connected in anti-parallel between said source and said load, each of said discharge devices having an anode, a cathode, an ignition electrode immersed in said cathode, a network comprising a plurality of rectifiers, the said network having a junction connected to one of said ignition electrodes and another junction connected to the other of said ignition electrodes, and means, including an auxiliary discharge device, for transmitting current through a portion of said network and said ignition electrodes to render one of said discharge devices conductive.

10. For use in supplying an alternating current load from a source of alternating current, the combination comprising a pair of main electric discharge devices of the immersed ignition electrode type connected in anti-parallel between said source and said load, each of said main discharge devices having an anode, a cathode, and an ignition electrode immersed in said cathode, a network comprising a plurality of rectifiers, the said network having a junction connected to one of said ignition electrodes and another junction connected to the other of said ignition electrodes, an auxiliary electric discharge device connected across the said network, and control means associated with said auxiliary discharge device for controlling the flow of current through the said network and said ignition electrodes to render said main discharge devices conductive.

11. In a system for supplying alternating current from a source of alternating current to a load, the combination comprising a pair of electric discharge devices of the immersed-ignition-electrode type connected in anti-parallel between said source and said load, each of said discharge devices having an anode, a cathode, and an ignition electrode immersed in said cathode, a plurality of back-to-back rectifiers connected between the ignition electrodes of said discharge devices, said rectifiers having a common junction, and means for transmitting current through said rectifiers and said ignition electrodes to render said discharge devices conductive, said means including a single discharge path connected to the common junction of said rectifiers.

12. For use in supplying an alternating current load from a source of alternating current, the combination comprising a pair of main electric discharge devices of the immersed ignition electrode type connected in anti-parallel between said source and said load, each of said main discharge devices having an anode, a cathode, and an ignition electrode immersed in said cathode, a network comprising a plurality of rectifiers, the said network having a junction between one pair of said rectifiers connected to one of said ignition electrodes and another junction between another pair of said rectifiers connected to the other of said ignition electrodes, an auxiliary electric discharge device connected across the said network, and control means associated with said auxiliary discharge device for controlling the flow of current from said source through the said network and said ignition electrodes to render said main discharge devices conductive.

RUSSELL W. STAGGS.